United States Patent [19]

Hernden

[11] Patent Number: 5,349,257

[45] Date of Patent: Sep. 20, 1994

[54] PERMANENT MAGNET GENERATOR WITH A POSITION SENSING COIL

[75] Inventor: Michael R. Hernden, Rockford, Ill.

[73] Assignee: Sundstrand Corporation, Rockford, Ill.

[21] Appl. No.: 43,510

[22] Filed: Apr. 6, 1993

[51] Int. Cl.$^5$ .................. H02K 11/00; H02P 6/02
[52] U.S. Cl. .................. 310/68 B; 318/254; 310/156
[58] Field of Search .......... 310/68 B, 156; 318/254, 318/721, 722; 324/207.11, 207.15

[56] References Cited

U.S. PATENT DOCUMENTS

| | | | |
|---|---|---|---|
| 3,908,130 | 9/1975 | Lafuze | 318/254 |
| 4,164,705 | 8/1979 | Whitney et al. | 310/68 D |
| 4,401,933 | 8/1983 | Davy et al. | 318/778 |
| 4,481,440 | 11/1984 | Müller | 310/156 |
| 4,696,795 | 9/1987 | Nakamizo et al. | 324/207.15 |
| 4,737,674 | 4/1988 | Miyao | 310/156 |
| 4,914,713 | 4/1990 | Mueller et al. | 310/68 B |
| 5,041,769 | 8/1991 | Iwai | 318/254 |
| 5,070,264 | 12/1991 | Conrad | 310/68 B |
| 5,124,604 | 6/1992 | Swartz | 310/68 B |

FOREIGN PATENT DOCUMENTS 0156656 12/1979 Japan .................. 324/207.15

Primary Examiner—Steven L. Stephan
Assistant Examiner—Clayton E. LaBalle
Attorney, Agent, or Firm—Marshall, O'Toole, Gerstein, Murray & Borun

[57] ABSTRACT

A permanent magnet generator includes a rotor having poles wherein one of poles of the rotor is non-magnetic. A stator has stator windings wound in cooperation with the poles of the rotor. The non-magnetic pole establishes at least one predetermined position of the rotor. A sensing coil is wound on the stator. The sensing coil responds to the non-magnetic pole by providing an electrical signal indicative of the predetermined position of the rotor.

18 Claims, 4 Drawing Sheets

PERMANENT MAGNET GENERATOR WITH A POSITION SENSING COIL

TECHNICAL FIELD OF THE INVENTION

The present invention relates generally to electromagnetic machines, and more particularly to an arrangement for determining the position of a generator rotor.

BACKGROUND OF THE INVENTION

In a power conversion system, such as a variable-speed, constant-frequency (VSCF) power generating system, a generator, typically a brushless, three-phase synchronous generator, is operated in a generating mode to convert variable-speed motive power supplied by a prime mover into variable-frequency AC power. The prime mover may be, for example, a gas turbine engine of an aircraft. The variable-frequency AC power produced by the generator is rectified and provided as a DC signal over a DC link to an inverter. The inverter inverts the DC signal on the DC link into constant-frequency AC power for supply over a load bus to one or more AC loads.

As is known, a generator can also be operated as a motor in a starting mode to convert electrical power supplied by an external AC power source into motive power which may in turn be provided to the prime mover to bring the prime mover up to self-sustaining speed. For example, when operated in a starting mode, the generator can be used to start a gas turbine engine of an aircraft.

One type of a brushless, synchronous generator, which can be operated in both a generating mode and a starting mode, includes a permanent magnet generator (PMG), an exciter, and a main generator all mounted on a common shaft. When such a generator is used in a starting mode, it is known to provide AC power at a controlled voltage and frequency to the armature windings of the main generator and to provide AC field current to the main generator field windings by way of the exciter in order to operate the generator as a motor to produce starting motive power. Respective inverters normally supply the AC power to the main generator armature windings and the AC field current to the exciter.

In order to properly accelerate and control the generator, and thereby the prime mover, during operation of the generator in its starting mode, it is necessary to properly commutate or switch the currents supplied by the inverter to the armature windings of the main generator in synchronism with the position of the shaft of the generator. In the past, synchronization was achieved by using a position sensor such as a resolver, a synchro, an optical encoder, or hall effect devices. For example, in Lafuze, U.S. Pat. No. 3,902,073, three hall effect sensors are mounted in an air gap of a permanent magnet generator so that they are 120° (electrical degrees) apart with respect to the permanent magnet rotor pole pairs of the permanent magnet generator. As the rotor of the permanent magnet generator rotates, the voltage across each hall effect sensor varies from zero to a maximum as a function of rotor position, thereby generating three generally trapezoidal voltages spaced apart in phase by 120°. Thus, the outputs from the hall effect sensors are representative of the position of the permanent magnet generator rotor. The output signals from the hall effect sensors are used to control switching elements in the inverter which supplies the AC power to the armature windings of the main generator.

The use of such position sensors entails considerable expense in the position sensor itself and its associated electronics, and further results in extra wires and extra assembly steps to install the position sensing apparatus. Also, operational parameters often limit the accuracy of such position sensors.

In view of the foregoing difficulties, other approaches have been taken in an effort to detect rotor position without the need for such position sensors. In the case of a brushless DC motor control, a back EMF approach has been used to detect rotor position. The back EMF of the motor is defined by the following equation:

$$E_{emf} = K\omega \sin\alpha$$

where K is a constant, $\omega$ is the angular speed of the motor, and $\alpha$ is the electrical phase angle of the rotor. From the foregoing equation, it can be seen that, since the angular speed $\omega$ of the motor is known or can be easily detected and since the back EMF of the motor can be detected, the rotor electrical phase angle $\alpha$ can be determined. The electrical phase angle $\alpha$ of the rotor is equivalent to rotor position and can be used in the proper commutation of the currents supplied to the armature windings of the motor.

The back EMF voltage can be detected using either of two methods, referred to as the direct method and the indirect method. The direct method can be used to directly measure phase of the back EMF voltage, but only when the phase winding is not energized by the inverter connected thereto and the winding is not short circuited either by closed switches in the inverter or by conducting flyback diodes in the inverter. Such conditions can be realized when a 120° commutation algorithm is utilized. In this case, a voltage reading is taken after a short delay following switching off of the phase winding to ensure complete current decay by the freewheeling diodes. This direct method is described in a paper entitled "Microcomputer Control for Sensorless Brushless Motor" by E. Iizuka et al., *IEEE Transactions on Industry Application,* Vol. IA-21, No. 4, May/June 1985.

The indirect method is based on estimating the back EMF from the motor terminal voltage and phase currents. This method is suitable for both 120° and 180° commutation algorithms. One technique that uses this method is described in a paper entitled "Position—and—Velocity Sensorless Control for Brushless DC Motor Using an Adaptive Sliding Mode Observer" by Furuhashi et al., *IEEE Transactions on Industrial Electronics,* Vol. 39, No. 2, April 1992.

Because the back EMF voltage of a motor is zero at standstill and the signal to noise ratio is very small at lower speeds, reliable determination of rotor position at low rotor speeds is difficult.

A method of using a permanent magnet generator as a position sensor for operating a generator in a starting mode is described in Stacey, U.S. Pat. No. 5,140,245. A standard brushless generator is equipped with a permanent magnet generator which is used as an emergency electric power source and as a source of control power when the brushless generator is operated normally as a generator. The permanent magnet generator develops a multiphase output which is supplied to a high resolution phase-locked loop having a binary counter which develops an output signal representing shaft position. In order to avoid ambiguous position readings, however, this method is limited to the situation where the number of permanent magnet generator rotor poles is equal to, or less than, the number of poles on the main generator rotor.

SUMMARY OF THE INVENTION

In accordance with the present invention, an internal position sensor is included within, and as part of, a permanent magnet generator in order to provide an indication of the position of the generator rotor. The use of an internal position sensor according to the present invention reduces the expense associated with external position sensors and their associated electronics, and reduces the number of wires and assembly steps required for installation of the position sensing apparatus. Also, the problems associated with the detection of a back EMF voltage and with using a permanent magnet generator in conjunction with a high resolution phase-locked loop and a binary counter to indicate rotor position can be eliminated.

Thus, in accordance with one aspect of the invention, an electromagnetic device includes a position determining means and a housing containing a rotor and a stator. The rotor has poles wherein at least some of the poles of the rotor are magnetic. The stator has stator windings wound in cooperation with the poles of the rotor. The position determining means determines a predetermined position of the rotor and includes a sensing coil within the housing.

In accordance with another aspect of the invention, an electromagnetic device includes a rotor having poles wherein at least some of the poles of the rotor are magnetic, a stator having stator windings wound in cooperation with the poles of the rotor, and a sensing coil wound on either the rotor or the stator. The sensing coil is arranged to provide an electrical signal indicative of a predetermined position of the rotor.

In accordance with a further aspect of the invention, a permanent magnet electromagnetic machine includes a rotor having N poles wherein N-1 poles of the N poles of the rotor are permanent magnets and wherein one of the N poles is a non-magnetic pole. A stator of the machine has a stator core and stator windings wound on the stator core in cooperation with the N poles of the rotor. A sensing coil is wound on the stator core in order to provide an electrical signal indicative of a predetermined position of the rotor.

In accordance with yet a further aspect of the invention, an electromagnetic machine includes a rotor having a plurality of magnetic poles and at least one non-magnetic pole. The at least one non-magnetic pole defines a predetermined position of the rotor. The electromagnetic machine also includes a stator and a position determining means for determining the predetermined position of the rotor in response to the at least one non-magnetic pole of the rotor.

In accordance with yet another aspect of the invention, an electromagnetic machine includes a rotor having a predetermined rotor position, a stator, and a sensing coil wound on the stator so as to produce an electrical pulse when the rotor is in its predetermined position.

BRIEF DESCRIPTION OF THE DRAWINGS

These and other features and advantages of the present invention will become more apparent from a detailed consideration of the invention when taken in conjunction with the drawing in which.

DETAILED DESCRIPTION

Figure 1:
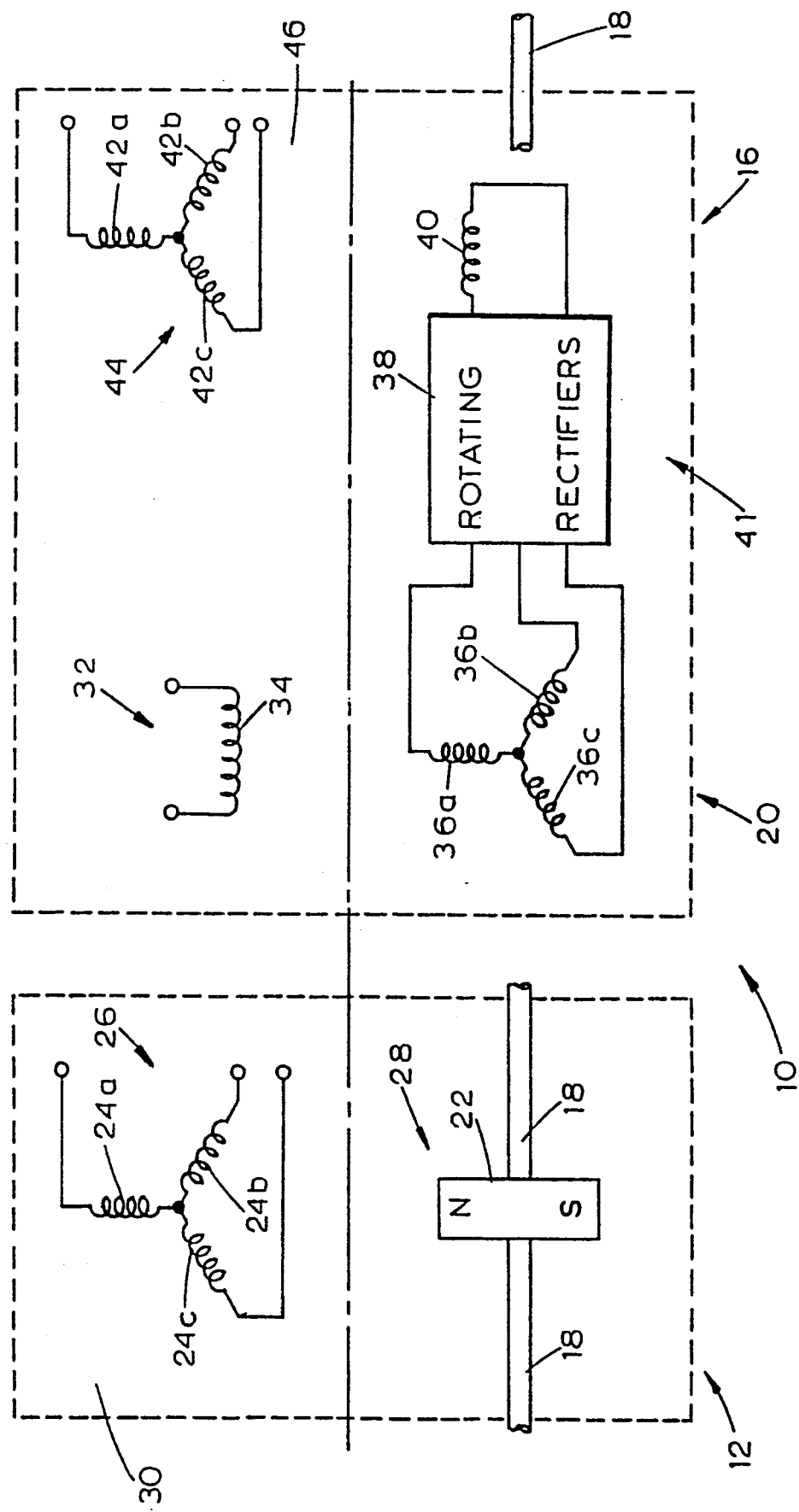
FIG. 1 illustrates a schematic diagram of a brushless, synchronous generator in which the present invention may be used.

In FIG. 1, a brushless, synchronous generator 10 includes a permanent magnet generator 12 and a main generator 16. The generator 10 further includes a motive power shaft 18 connected to a rotor 20 of the generator 10. The rotor 20 carries one or more permanent magnets 22 which form poles of the permanent magnet generator 12. Rotation of the motive power shaft 18 causes relative movement between the magnetic flux produced by the permanent magnets 22 and a set of three-phase permanent magnet generator armature windings 24a, 24b, and 24c. Typically, the permanent magnet generator windings 24a, 24b, and 24c are included in a stator 26 of the permanent magnet generator 12 and the permanent magnets 22 are included in a rotor 28 of the permanent magnet generator 12. The stator 26 and the rotor 28 of the permanent magnet generator 12 are contained within a housing 30.

An exciter 32 of the main generator 16 includes a field winding 34 and a set of three-phase armature windings 36a, 36b, and 36c typically rotated by the motive power shaft 18 to which the permanent magnets 22 of the rotor 28 are affixed. A set of rotating rectifiers 38 interconnect the armature windings 36a, 36b, and 36c and a main generator field winding 40. The three-phase armature windings 36a, 36b, and 36c, the set of rotating rectifiers 38, and the field winding 40 form a main generator rotor 41 of the main generator 16.

A set of three-phase main generator armature windings 42a, 42b, and 42c are disposed within a stator 44 of the main generator 16. The rotor 41 and the stator 44 of the main generator 16 are typically contained within a housing 46.

During operation of the generator 10 in its generating mode, at least one, and preferably all three, of the permanent magnet generator windings 24a, 24b, and 24c are coupled through a rectifier and a voltage regulator (not shown) to the exciter field winding 34. As the motive power shaft 18 is rotated, power is produced by the permanent magnet generator windings 24a, 24b, and 24c. The power produced by the permanent magnet generator windings 24a, 24b, and 24c is typically rectified, regulated, and delivered to the exciter field winding 34. AC power is produced in the rotating armature windings 36a, 36b, and 36c, rectified by the rotating rectifiers 38, and applied to the main generator field winding 40. Rotation of the motive power shaft 18 and the field winding 40 induces three-phase AC voltages in the main generator windings 42a, 42b, and 42c.

If motive power is supplied to the shaft 18 by a variable aircraft turbine engine, for example, the windings 42a, 42b, and 42c provide wild frequency AC output power. If the loads of the generator 10 require constant frequency AC power, this wild frequency, AC output power produced by the windings 42a, 42b, and 42c is rectified to produce a direct current signal. This direct current signal is then inverted to produce constant frequency AC power.

Often, it is desired to use the brushless, synchronous generator 10 as a motor to bring the prime mover (not shown), such as the gas turbine engine of an aircraft, up to self-sustaining speed. This operation is accomplished by providing AC electrical power to the field winding 40 by way of the field winding 34 of the exciter 32, by providing AC power to the main generator armature windings 42a, 42b, and 42c, and by suitably commutating the currents flowing in the main generator armature windings 42a, 42b, and 42c to cause the motive power shaft 18 to rotate. The supply of AC power to the main generator armature windings 42a, 42b, and 42c must be synchronized with the position of the motive power shaft 18 in order to properly rotate the motive power shaft 18 during engine starting operation. The permanent magnet generator described in relation to FIGS. 2-6 includes an internal position sensor by which the position of the motive power shaft 18 can be determined and used for synchronizing the AC power supplied to the main generator armature windings 42a, 42b, and 42c with the position of the motive power shaft 18.

Figure 2:
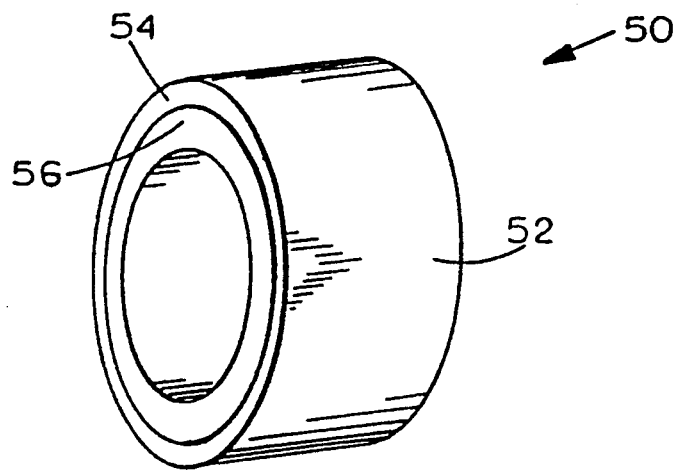
FIG. 2 illustrates a perspective view of the permanent magnet generator of the generator shown in FIG. 1.

As shown in FIG. 2, a permanent magnet generator 50 according to the present invention includes a housing 52 within which a stator 54 and a rotor 56 may be contained. Both the stator 54 and the rotor 56 may be ring-shaped having a length of approximately one inch. The diameter of the rotor 56 may be, for example, three inches.

Figures 3, 4:
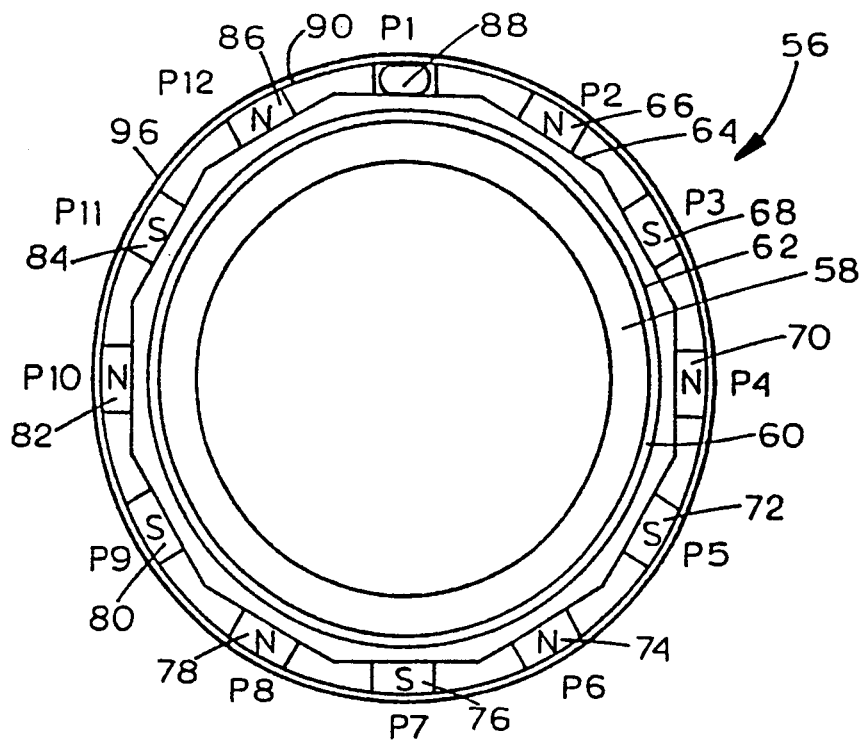
FIG. 3 illustrates the rotor of the permanent magnet generator shown in FIG. 2.
FIG. 4 illustrates the stator of the permanent magnet generator shown in FIG. 2.

The rotor 56 is shown in more detail in FIG. 3. The rotor 56 includes a generator shaft 58 which is similar to the motive power shaft 18 shown in FIG. 1. Surrounding the generator shaft 58 is a hub 60 which may conveniently be fabricated from a magnetic steel in order to support a flux path within the rotor 56. Around an outer perimeter 62 of the hub 60 is a pole ring 64 having a plurality of permanent magnets 66, 68, 70, 72, 74, 76, 78, 80, 82, 84, and 86 and a non-magnetic material 88 embedded therein.

Each of the poles P2-P12 includes a corresponding one of the permanent magnets 66, 68, 70, 72, 74, 76, 78, 80, 82, 84, and 86. As shown in FIG. 3, the permanent magnets 66, 70, 74, 78, 82, and 86 are magnetized to be north poles, and the permanent magnets 68, 72, 76, 80, and 84 are magnetized to be south poles. The pole P1 includes the non-magnetic material 88, which may be tungsten, ceramic, or the like. The pole P1, in conjunction with a sensing winding to be described hereinafter, establishes a predetermined position of the rotor 56. The non-magnetic material 88 has a size so that the weight of the non-magnetic pole P1 is substantially equal to the weight of each of the magnetic poles P2-P12. Accordingly, since all of the poles P1-P12 have the same weight, the rotor 56 is substantially balanced.

The rotor 56 further includes a containment ring 90 which contains the poles P1-P12 within the pole ring 64 and around the hub 62 and the generator shaft 58. The containment ring 90 is fabricated from a non-magnetic material such as stainless steel.

As shown in FIG. 2, surrounding the rotor 56, which is supported by the generator shaft 58 for rotation, is a stator 54. As shown in FIG. 4, the stator 54 includes a stator ring 92 although, preferably, the stator 54 includes a plurality of stator rings 92 laminated together so that the stator 54 may be used in high frequency applications. If the stator 54 includes a plurality of laminated stator rings 92, the laminated stator rings 92 may be bonded together with a bonding agent such as a high temperature epoxy.

The stator ring 92 has an inner circumference 94 arranged to be somewhat larger than an outer circumference 96 (FIG. 3) of the containment ring 90 of the rotor 56. Arranged within the stator ring 92 and around the inner perimeter 94 thereof are a plurality of slots 98 labeled in FIG. 4 as slots S1-S36. Thirty six slots are shown in FIG. 4, although the number of slots may vary. The number of slots is related to the number of poles in the rotor 56 and the number of phases of AC power to be supplied by the stator phase windings wound on the stator 54.

Such stator phase windings are provided in selected ones of the slots 98 of the stator 54. In addition, sensing coils are provided in selected ones of the slots 98. These sensing coils, in conjunction with the non-magnetic pole P1 shown in FIG. 3, provide corresponding electrical pulses indicating the predetermined position of the rotor 56 with respect to each stator phase winding.

Figure 6:
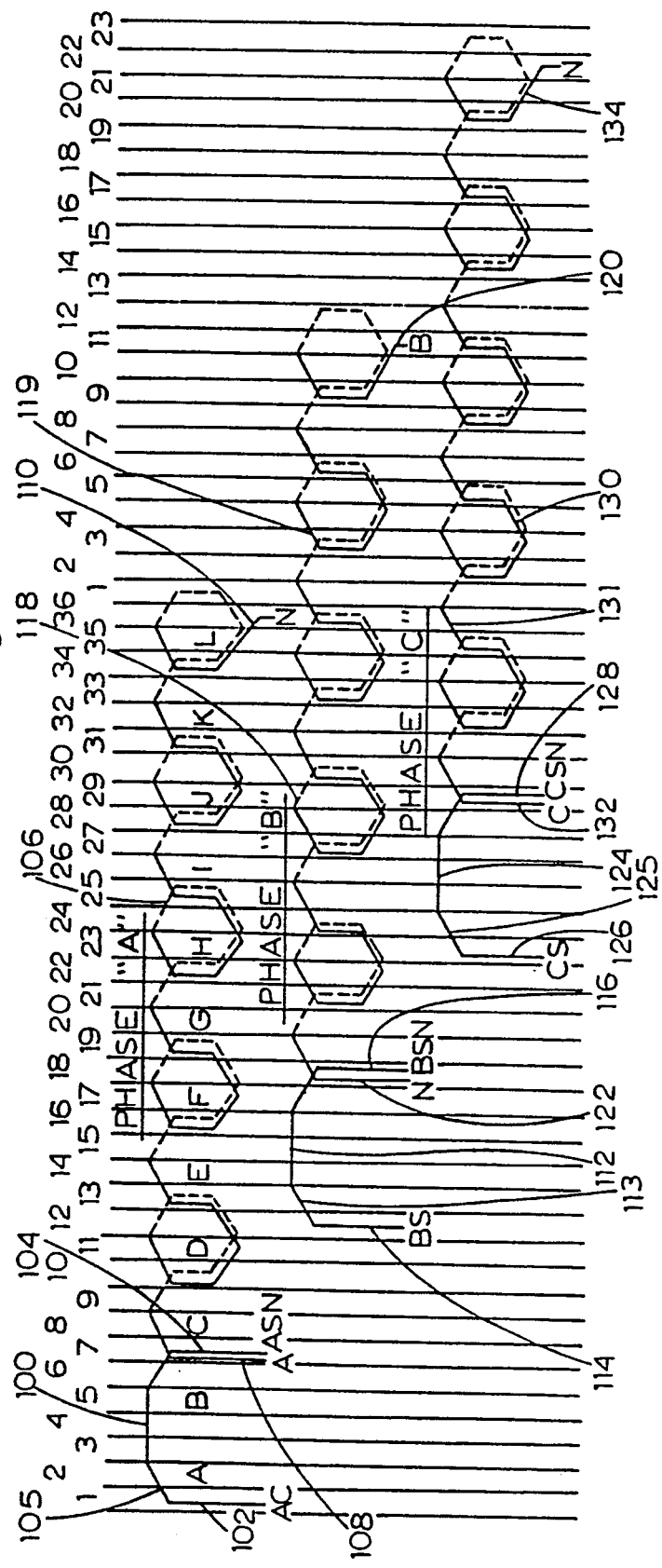
FIG. 6 illustrates the manner of winding sensing coils and phase windings onto the stator of the permanent magnet generator shown in FIG. 2; and, FIG. 7 illustrates the relationship between sensing coils and phase windings which are wound onto the stator in the manner shown in FIG. 6.

As shown in FIGS. 4 and 6, a first sensing coil 100 is wound in the slots S1 and S7 of the stator 54. The slot numbers of the slots S1-S36 of the stator 54 shown in FIG. 4 are carried over into FIG. 6 in order to demonstrate the relationship between the phase windings and sensing coils and the slots of the stator 54. In FIG. 6, the slot numbers begin with 1 and end with 36 and are then repeated so that the sensing coils and phase windings may be shown linearly. Thus, the repetition of slot numbers is for convenience only, it being understood that there are only 36 slots in the embodiment of the stator 54 as shown in FIG. 4.

The sensing coil 100 is wound by first inserting an electrical conductor 105 into the page through the slot S1 of the stator 54 (as viewed in FIG. 4), and then pulling the electrical conductor 105 out of the page through the slot S7 of the stator 54. In the same manner, the electrical conductor 105 may then be inserted into the slot S1, and pulled back through the slot S7 as many times as necessary to provide a desired number of turns for the sensing coil 100. Ends 102 and 104 of the electrical conductor 105 are available for connection to a suitable circuit, such as that which synchronizes the supply of AC current to the armature windings 42a, 42b, and 42c of the generator 10 with the position of the motive power shaft 18 during engine starting operations.

The stator 54 is wound with three phase windings. These three phase windings are the PHASE "A", PHASE "B", and PHASE "C" windings as shown in FIG. 6. However, only one such phase winding is shown in FIG. 4 for clarity, it being understood that the stator 54 would also be wound with the other two phase windings as well as the other two sensing coils as shown in FIG. 6.

A PHASE "A" winding 106 is wound beginning with the slot S7 of the stator 54 by inserting an electrical conductor 107 into the page through the slot S7 of the stator 54 (as viewed in FIG. 4) and pulling the electrical conductor 107 out of the page through the slot S10. The electrical conductor 107 is inserted back into the page through the slot S13 and pulled out of the page through the slot S10. The electrical conductor 107 is inserted into the page through the slot S13 and is pulled out of the page through the slot S16. The electrical conductor 107 is inserted into the page through the slot S19, pulled out of the page through the slot S16, inserted into the page through the slot S19, pulled out of the page through the slot S22, inserted into the page through the slot S25, pulled out of the page through the slot S22, inserted into the page through the slot S25, pulled out of the page through the slot S28, inserted into the page through the slot S31, pulled out of the page through the slot S28, inserted into the page through the slot S31, pulled out of the page through the slot S34, is inserted into the page through the slot S1, and finally pulled out of the page through the slot S34. This process may be repeated any number of times until the desired number of turns is provided for the PHASE "A" winding 106. As shown in FIGS. 4 and 6, the winding 106 has two ends 108 and 110 for connection to a suitable circuit. Accordingly, the sensing coil 100 is wound on the stator 54 in order to provide an electrical pulse 111 (FIG. 5) with respect to both the predetermined position of the rotor 56 as determined by the non-magnetic pole P1 of the rotor 56 and the first phase winding 106.

Figure 5:
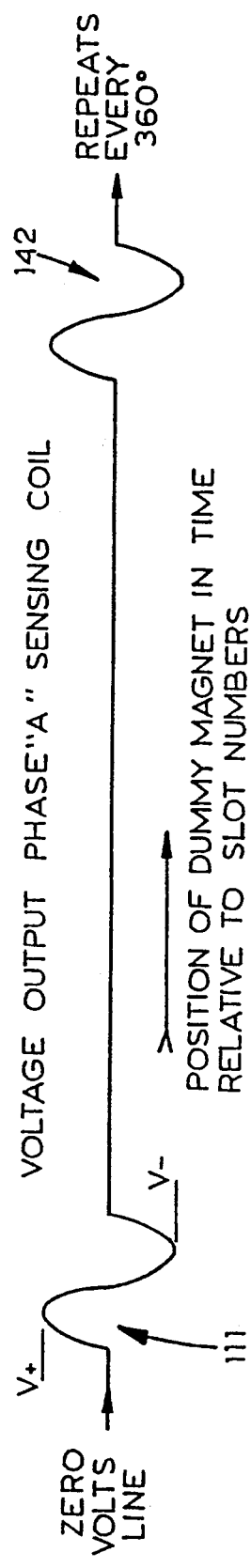
FIG. 5 illustrates the output electrical signal from an internal sensing coil mounted on the stator of the permanent magnet generator shown in FIG. 2.

This electrical pulse 111 is shown in FIG. 5. The sensing coil 100 provides this electrical pulse 111 in the form of one cycle of AC for each 360° of mechanical rotation of the rotor 56. The sensing coil 100 is wound so that, when the non-magnetic pole P1 of the rotor 56 not in the vicinity of the sensing coil 100, the magnetic poles P2-P12 induce opposing potentials across the sensing coil 100. These opposing potentials negate one another to produce zero current flow through the sensing coil 100. However, as the non-magnetic pole P1 of the rotor 56 passes by the slot S1 of the stator 54, the magnetic pole P2 of the rotor 56 passes by the slot S7 and induces a positive half cycle of current through the sensing coil 100. Then, as the non-magnetic pole P1 of the rotor 56 passes by the slot S7, the magnetic pole P12 of the rotor 56 passes by the slot S1 and induces a negative half cycle of current through the sensing coil 100. Accordingly, the electrical pulse 111 as shown in FIG. 5 is induced in the sensing winding 100. During the following 360° of rotation, a similar electrical pulse will be induced in the sensing coil 100 as the non-magnetic pole P1 again passes by the slots S1 and S7.

As shown in FIG. 6, a second sensing coil 112 is wound in the slots S12 and S18 of the stator 54 by use of an electrical conductor 113 in a manner similar to the manner in which the sensing coil 100 is wound. Also as shown in FIG. 6, the sensing coil 112 is displaced along the stator 54 by 110° of mechanical rotation with respect to the sensing coil 100. Ends 114 and 116 of the electrical conductor 113 are available for connection to a suitable-circuit, such as that which synchronizes the supply of AC current to the armature windings 42a, 42b, and 42c of the generator 10 with the position of the motive power shaft 18 during engine starting operations. A PHASE "B" winding 118 is wound by use of an electrical conductor 119 around the stator 54 in the slots S9, S12, S6, S3, S36, S33, S30, S27, S24, S21, and S18 in a manner similar to the manner in which the PHASE "A" winding 106 is wound. Ends 120 and 122 of the electrical conductor 119 are available for connection to a suitable circuit, such as that which supplies AC current to the exciter field winding 34 of the generator 10.

An electrical pulse similar to the electrical pulse 111 shown in FIG. 5 is provided by the sensing coil 112. The sensing coil 112 provides this electrical pulse in the form of one cycle of AC for each 360° of rotation of the rotor 56. Since the sensing coil 112 is displaced along the stator 54 by 110° of mechanical rotation with respect to the sensing coil 100, the electrical pulse produced by the sensing coil 112 is displaced in phase by 110° with respect to the electrical pulse produced by the sensing coil 100 and indicates the position of the rotor 56 with respect to the PHASE "B" winding 118.

Also as shown in FIG. 6, a third sensing coil 124 is wound in the slots S23 and S29 of the stator 54 by use of an electrical conductor 125 in a manner similar to the manner in which the sensing coils 100 and 112 are wound. The sensing coil 124 is displaced along the stator 54 by 220° and 110° from the sensing coils 100 and 112. Ends 126 and 128 of the electrical conductor 125 are available for connection to a suitable circuit, such as that which synchronizes the supply of AC current to the armature windings 42a, 42b, and 42c of the generator 10 with the position of the motive power shaft 18 during engine starting operations. A PHASE "C" winding 130 is wound by use of an electrical conductor 131 around the stator 54 in the slots S29, S32, S35, S2, S5, S8, S11, S14 S17, S20, and S23 in a manner similar to the manner in which the PHASE "A" winding 106 and the PHASE "B" winding 118 are wound. Ends 132 and 134 of the electrical conductor 131 are available for connection to a suitable circuit, such as that which supplies AC current to the exciter field winding 34 of the generator 10.

An electrical pulse similar to the electrical pulse 111 shown in FIG. 5 is produced by the sensing coil 124. The sensing coil 124 provides this electrical pulse in the form of one cycle of AC for each 360° of rotation of the rotor 56. Since the sensing coil 124 is displaced along the stator 54 by 220° and 110° from the sensing coils 100 and 112, the electrical pulse produced by the sensing coil 124 is displaced by 220° and 110° with respect to the electrical pulses produced by the sensing coils 100 and 112 and indicates the position of the rotor 56 with respect to the PHASE "C" winding 130.

Figure 7:
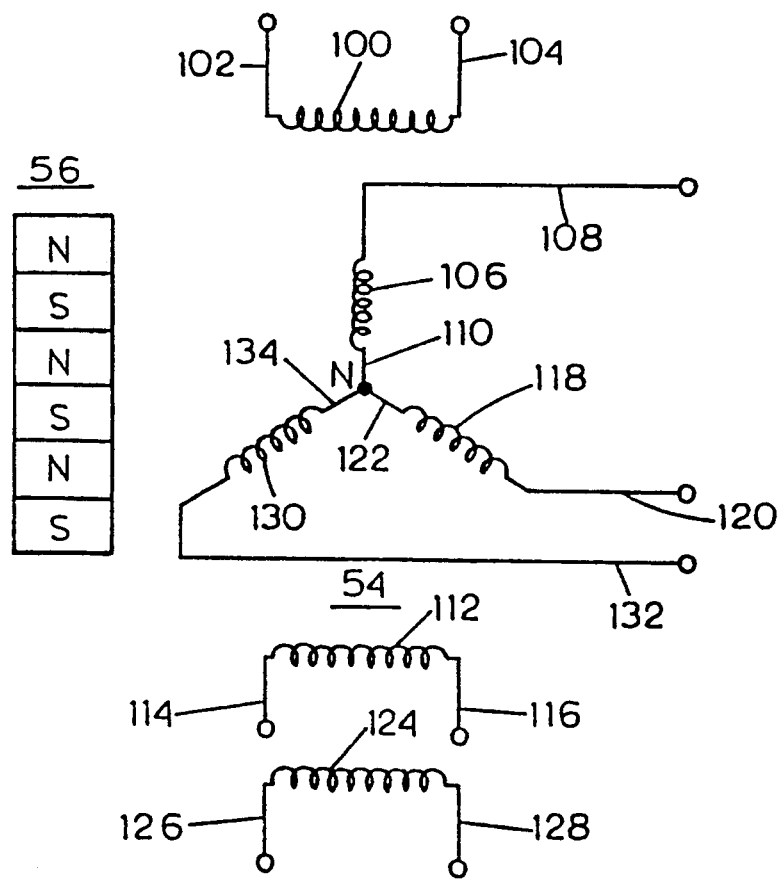

As shown in FIG. 7, the terminal end 110 of the PHASE "A" winding 106, the terminal end 122 of the PHASE "B" winding 118, and the terminal end 134 of the PHASE "C" winding 130 may all be connected together to form a neutral point N of the three phase windings 106, 118, and 130 wound on the stator 54. The terminal end 108 of the PHASE "A" winding 106, the terminal end 120 of the PHASE "B" winding 118, and the terminal end 132 of" the PHASE "C" winding 130 are all available for connection to a suitable circuit. These three phase windings 106, 118, and 130 are similar to the permanent magnet generator windings 24a, 24b, and 24c shown in FIG. 1.

With this arrangement, the sensing coils 100, 112, and 124 produce position indicating electrical pulses relative to their rotational mechanical positions. The stator windings 106, 118, and 130 produce three-phase alternating current signals substantially 120° apart in phase with respect to one another.

As shown in FIG. 6, the phase B sensing winding 112 is displaced from the sensing winding 100 by 110° instead of by 120° because the phase A winding 106 occupies slot S13, which requires the end 114 of the sensing winding 112 to occupy slot S12 instead of slot S13. Similarly, the phase C sensing winding 124 is displaced from the sensing winding 112 by 110° instead of by 120° because the phase B winding 118 occupies slot S24, which requires the end 126 of the sensing winding 124 to occupy slot S23 instead of slot S24. This 10° offset can be accommodated electronically. Alternatively, the sensing windings are not required to carry substantial currents and, therefore, they may be small enough to be wound in slots already occupied by phase windings.

Numerous other modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An electromagnetic device comprising:
   a housing;
   a rotor within the housing, the rotor having poles, wherein at least some of the poles of the rotor are magnetic, and wherein one of the poles of the rotor is a non-magnetic poles;
   a stator within the housing, the stator having stator windings wound in cooperation with the poles of the rotor; and,
   position determining means for determining a pre determined position of the rotor, the position determining means including a sensing coil within the housing wherein the sensing coil is wound with respect to the poles of the rotor so as to produce an electrical pulse when the non-magnetic pole is in the vicinity of the sensing coil and so as to produce substantially no electrical signal when the non-magnetic pole is not in the vicinity of the sensing coil.

2. The electromagnetic device of claim 1 wherein the sensing coil of the position determining means is wound on the stator.

3. The electromagnetic device of claim 1 wherein all of the other poles of the rotor are magnetic, wherein each of the magnetic poles of the rotor has a corresponding weight, and wherein the non-magnetic pole has a weight substantially equal to the weight of each of the magnetic poles of the rotor.

4. The electromagnetic device of claim 3 wherein the magnetic poles of the rotor are permanent magnets.

5. An electromagnetic device comprising:
   a rotor having Doles wherein at least some of the poles of the rotor are magnetic and wherein one of the Doles of the rotor is a non-magnetic pole;
   a stator having stator windingswound in cooperation with the poles of the rotor; and.
   a sensing coil wound on the stator, the sensing coil being arranged to provide an electrical signal indicative of a predetermined position of the rotor the sensing coil being wound with respect to the poles of the rotor so as to produce an electrical pulse when the non-magnetic pole is in the vicinity of the sensing coil and so as to produce substantially no electrical signal when the non-magnetic pole is not in the vicinity of the sensing coil.

6. The electromagnetic device of claim 5 wherein all but one of the other poles of the rotor are magnetic, wherein each of the magnetic poles of the rotor has a corresponding weight, and wherein the non-magnetic pole has a weight substantially equal to the weight of each of the magnetic poles of the rotor.

7. The electromagnetic device of claim 6 wherein the magnetic poles of the rotor are permanent magnets.

8. A permanent magnet electromagnetic machine comprising:
   a rotor having N poles wherein N-1 poles of the N poles of the rotor are permanent magnets and wherein one of the N poles is a non-magnetic Dole:
   a stator having a stator core and stator windings wound on the stator core in cooperation with the N poles of the rotor: and,
   a sensing coil wound on the stator core so as to provide an electrical signal indicative of a predetermined position of the rotor said predetermined position of the rotor being dependent upon placement of the non-magnetic pole in the rotor, the sensing coil being wound so as to produce an electrical pulse when the non-magnetic pole of the rotor is in the vicinity of the sensing coil and so as to produce substantially no electrical signal when the non-magnetic pole of the rotor is not in the vicinity of the sensing coil.

9. The permanent magnet electromagnetic machine of claim 8 wherein the N-1 poles of the rotor are of substantially equal weight, and wherein the non-magnetic pole has a weight substantially equal to the weight of the N-1 poles of the rotor.

10. An electromagnetic machine comprising:
    a rotor having a plurality of magnetic poles and at least one non-magnetic pole, the at least one non-magnetic pole defining a predetermined position of the rotor;
    a stator; and,
    position determining means for determining the predetermined position of the rotor in response to the at least one non-magnetic pole of the rotor, the position determining means comprising a sensing coil wound on the stator so as to produce an electrical pulse when the non-magnetic pole of the rotor is in the vicinity of the sensing coil and so as to produce substantially no electrical signal when the non-magnetic pole of the rotor is not in the vicinity of the sensing coil.

11. (Amended) An electromagnetic machine comprising:
    a rotor having a predetermined rotor position:
    a stator; and,
    a sensing coil wound on the stator so as to produce an electrical pulse when the rotor is in its predetermined position and so as to produce substantially no electrical signal when the rotor is not in its predetermined position.

12. An electromagnetic machine comprising:
    a rotor having a predetermined rotor position comprising an element defining the predetermined rotor position;
    a stator: and
    a sensing coil wound on the stator so as to produce an electrical pulse when the element of the rotor is in the vicinity of the sensing coil and so as to produce substantially no electrical signal when the element of the rotor is not in the vicinity of the sensing coil.

13. The electromagnetic machine of claim 12 wherein the element is non-magnetic.

14. The electromagnetic machine of claim 13 wherein the element has a weight selected so as not to unbalance the rotor.

15. An electromagnetic machine comprising:
   a rotor having a plurality of magnetic poles and at least one non-magnetic pole, the at least one non-magnetic pole defining a predetermined position of the rotors, the plurality of magnetic poles and the at least one non-magnetic pole being distributed with generally equal spacing around the rotor;
   a stator; and
   position determining means for determining the predetermined position of the rotor in response least one non-magnetic pole of the rotor.

16. The electromagnetic machine of claim 15 wherein the position determining means comprises a sensing coil wound on the stator so as to produce an electrical pulse when the non-magnetic pole of the rotor is in the vicinity of the sensing coil.

17. The electromagnetic machine of claim 15 wherein the position determining means comprises a sensing coil wound on the stator so as to produce an electrical pulse when the non-magnetic pole of the rotor is in the vicinity of the sensing coil and so as to produce substantially no electrical signal when the non-magnetic pole of the rotor is not in the vicinity of the sensing coil.

18. An electromagnetic machine comprising
   a rotor having a predetermined rotor position;
   a stator; and,
   a sensing coil wound on the stator so as to produce an electrical signal indicative of when the rotor is in its predetermined position, the sensing coil receiving no current through an electrical connection thereto, the sensing coil being wound on the stator so as to produce an electrical pulse when the rotor is in its predetermined position and so as to produce substantially no electrical signal when the rotor is not in its predetermined position.

* * * * *